US00RE44660E

(19) United States
(12) Reissued Patent
Lee et al.

(10) Patent Number: US RE44,660 E
(45) Date of Reissued Patent: Dec. 24, 2013

(54) OPTICAL DISC HAVING A PLURALITY OF RECORDING LAYERS, AND RECORDING METHOD AND REPRODUCING METHOD THEREFOR

(75) Inventors: Kyung-geun Lee, Osan-si (KR); In-sik Park, Suwon-si (KR); Myong-do Ro, Yongin-si (KR); Du-seop Yoon, Seongnam-si (KR); Chang-min Park, Suwon-si (KR)

(73) Assignee: Samsung Electronics Co., Ltd., Suwon-si (KR)

(21) Appl. No.: 13/543,372

(22) Filed: Jul. 6, 2012

Related U.S. Patent Documents

Reissue of:
(64) Patent No.: 7,751,300
Issued: Jul. 6, 2010
Appl. No.: 11/869,827
Filed: Oct. 10, 2007

U.S. Applications:
(63) Continuation of application No. 10/447,201, filed on May 29, 2003, now Pat. No. 7,298,689.

(30) Foreign Application Priority Data

May 30, 2002 (KR) ..... 2002-30301

(51) Int. Cl.
*G11B 7/24* (2013.01)

(52) U.S. Cl.
USPC ..... 369/275.3; 369/275.1

(58) Field of Classification Search
USPC ..... 369/275.3, 275.2, 275.1, 275.4, 59.25, 369/44.26, 59.12, 53.2, 53.41
See application file for complete search history.

(56) References Cited

U.S. PATENT DOCUMENTS

| | | | |
|---|---|---|---|
| 5,737,287 | A | 4/1998 | Lee |
| 5,881,032 | A | 3/1999 | Ito et al. |
| 6,030,678 | A | 2/2000 | Aratani |
| 6,072,759 | A | 6/2000 | Maeda et al. |
| 6,078,559 | A | 6/2000 | Takemura et al. |
| 6,160,778 | A | 12/2000 | Ito et al. |

(Continued)

FOREIGN PATENT DOCUMENTS

| | | | |
|---|---|---|---|
| CN | 1204839 | A | 1/1999 |
| EP | 0 986 051 | A1 | 3/2000 |

(Continued)

OTHER PUBLICATIONS

International Search Report issued on Jul. 16, 2003, in counterpart International Application. No. PCT/KR03/00755 (3 pages, in English).

(Continued)

*Primary Examiner* — Tan X Dinh
(74) *Attorney, Agent, or Firm* — NSIP Law

(57) ABSTRACT

An optical disc includes a plurality of recording layers, each layer having a lead-in area, a data area, and a lead-out area. A dedicated-reproducing area having a disc-related information zone, and a rewritable area are provided in at least one of the lead-in and lead-out areas of the optical disc. Accordingly, a reliability of a data recording/reproducing with respect to the optical disc is improved.

10 Claims, 16 Drawing Sheets

(56) References Cited

U.S. PATENT DOCUMENTS

| | | | | |
|---|---|---|---|---|
| 6,189,118 | B1 | 2/2001 | Sasaki et al. | |
| 6,546,502 | B1 | 4/2003 | Ishi | |
| 6,772,429 | B2 | 8/2004 | Yoon et al. | |
| 6,967,918 | B2 | 11/2005 | Lee et al. | |
| 6,973,016 | B2 | 12/2005 | Fukushima et al. | |
| 7,065,015 | B2 | 6/2006 | Lee et al. | |
| 7,123,568 | B2 | 10/2006 | Choi et al. | |
| 7,151,729 | B1 | 12/2006 | Park et al. | |
| 7,298,689 | B2 | 11/2007 | Lee et al. | |
| 7,359,304 | B2 | 4/2008 | Suh | |
| 7,372,801 | B2 | 5/2008 | Lee et al. | |
| 7,701,813 | B2 * | 4/2010 | Miyagawa | 369/44.26 |
| 2001/0033543 | A1 | 10/2001 | Akiyama et al. | |
| 2001/0036136 | A1 | 11/2001 | Fukushima et al. | |
| 2002/0041541 | A1 | 4/2002 | Tsukada et al. | |
| 2002/0118620 | A1 | 8/2002 | Lee et al. | |
| 2003/0002427 | A1 | 1/2003 | Lee et al. | |
| 2003/0137909 | A1 | 7/2003 | Ito et al. | |
| 2003/0227846 | A1 | 12/2003 | Lee et al. | |
| 2004/0013074 | A1 | 1/2004 | Lee et al. | |
| 2004/0032813 | A1 * | 2/2004 | Lee et al. | 369/275.3 |
| 2006/0013118 | A1 | 1/2006 | Ishida et al. | |
| 2008/0175138 | A1 * | 7/2008 | Miyagawa | 369/275.4 |
| 2009/0087170 | A1 | 4/2009 | Shimizu et al. | |
| 2009/0207721 | A1 * | 8/2009 | Nakatani et al. | 369/275.3 |

FOREIGN PATENT DOCUMENTS

| | | | |
|---|---|---|---|
| EP | 1 168 315 | A2 | 1/2002 |
| JP | 6-302111 | | 10/1994 |
| JP | 6-302111 | A | 10/1994 |
| JP | 8-255347 | | 10/1996 |
| JP | 8-255347 | A | 10/1996 |
| JP | 9-231613 | | 9/1997 |
| JP | 9-231613 | A | 9/1997 |
| JP | 2000-057713 | | 2/2000 |
| JP | 2000-57713 | A | 2/2000 |
| JP | 2000-52778 | | 8/2000 |
| JP | 2000-322818 | | 11/2000 |
| JP | 2000-322818 | A | 11/2000 |
| JP | 2001-0011557 | | 2/2001 |
| JP | 2001-266361 | | 9/2001 |
| JP | 2001-266361 | A | 9/2001 |
| JP | 2001-331945 | | 11/2001 |
| JP | 2001-331945 | A | 11/2001 |
| JP | 2001-357628 | | 12/2001 |
| JP | 2001-357628 | A | 12/2001 |
| JP | 2002-42349 | | 2/2002 |
| JP | 2002-42349 | A | 2/2002 |
| JP | 2002-133714 | | 5/2002 |
| JP | 2002-133714 | A | 5/2002 |
| JP | 2002-140822 | | 5/2002 |
| JP | 2002-140822 | A | 5/2002 |
| JP | 2002-150568 | | 5/2002 |
| JP | 2002-150568 | A | 5/2002 |
| KR | 2000-0052778 | A | 8/2000 |
| KR | 2001-0011557 | A | 2/2001 |
| KR | 10-2002-0006572 | A | 1/2002 |

OTHER PUBLICATIONS

Japanese Office Action issued on Jan. 20, 2009, in counterpart Japanese Application No. 2004-509937 (3 pages, in Japanese, no English translation).

Korean Notice of Allowance issued on Jun. 8, 2009, in counterpart Korean Application No. 10-2002-0030301 (4 pages, in Korean, no English translation).

Japanese Office Action issued on Jun. 16, 2009, in counterpart Japanese Application No. 2004-509937 (2 pages, in Japanese, including English translation of relevant portion).

Chinese Office Action issued on Jul. 10, 2009, in counterpart Chinese Application No. 038125056 (18 pages, in Chinese, including English translation of substantive portion).

Chinese Office Action issued on Nov. 6, 2009, in counterpart Chinese Application No. 038125056 (15 pages, in Chinese, including complete English translation).

Polish Office Action issued on Mar. 2, 2010, in counterpart Polish Application No. P.373678 (4 pages, in Polish, including complete English translation).

Jun. 1999. EDMA: Standardizing Information and Communication Systems: 120 mm DVD Rewritable Disk (DVD-RAM). *Standard ECMA-272, 2nd Edition:* 1-99 with table of contents.

European Summons to Attend Oral Proceedings mailed Sep. 25, 2012, issued in counterpart European Patent Application No. 03 715 841.7; 8 pages in English language.

Polish Official Letter mailed Sep. 28, 2012, issued in counterpart Polish Patent Application No. P.373678; 3 pages including English translation.

Polish Office Action issued on Feb. 21, 2013 in counterpart Polish Patent Application No. P373678 (4 pages, in Polish, including complete English translation).

U.S. Appl. No. 10/447,201, filed May 2003, Lee et al., Samsung Electronics Co., Ltd.

Final Rejection issued by Japanese Patent Office in Japanese Patent Application No. 2004-509937 on Jun. 16, 2009.

Office Action issued by Chinese Patent Office in Chinese patent Application No. 038125056 on Jul. 10, 2009.

Chinese Office Action issued on Nov. 6, 2009, in Chinese Application No. 038125056 (7 pages, in Chinese, with complete English translation).

Polish Office Action issued on Mar. 3, 2010, in corresponding Polish Application No. P.373678 (3 pages).

* cited by examiner

FIG. 4

<table>
<tr><td colspan="2">SPECIFICATION</td><td>$\ell_0$</td><td>$\ell_1$</td><td></td></tr>
<tr><td rowspan="2">DEDICATED REPRODUCING AREA</td><td rowspan="6">LEAD-IN</td><td>DISC-RELATED INFORMATION ZONE</td><td>DISC-RELATED INFORMATION ZONE</td><td rowspan="5">LEAD-OUT</td></tr>
<tr><td>CONNECTION ZONE</td><td>CONNECTION ZONE</td></tr>
<tr><td rowspan="4">REWRITABLE AREA</td><td>TEST ZONE</td><td>TEST ZONE</td></tr>
<tr><td>DISC CONTROL DATA ZONE</td><td>DISC CONTROL DATA ZONE</td></tr>
<tr><td>DEFECT MANAGEMENT ZONE</td><td>DEFECT MANAGEMENT ZONE</td></tr>
<tr><td>DATA AREA</td><td></td><td></td><td>DATA AREA</td></tr>
<tr><td rowspan="2">LEAD-OUT</td><td>DEFECT MANAGEMENT ZONE</td><td>DEFECT MANAGEMENT ZONE</td><td rowspan="2">LEAD-IN</td></tr>
<tr><td>BUFFER ZONE</td><td>BUFFER ZONE</td></tr>
</table>

FIG. 5

<table>
<tr><td colspan="2">SPECIFICATION</td><td>$\ell_0$</td><td>$\ell_1$</td><td></td></tr>
<tr><td rowspan="2">DEDICATED REPRODUCING AREA</td><td rowspan="6">LEAD-IN</td><td>DISC-RELATED INFORMATION ZONE</td><td>–</td><td rowspan="5">LEAD-OUT</td></tr>
<tr><td>–</td><td>CONNECTION ZONE</td><td>CONNECTION ZONE</td></tr>
<tr><td rowspan="4">REWRITABLE AREA</td><td>TEST ZONE</td><td>TEST ZONE</td></tr>
<tr><td>DISC CONTROL DATA ZONE</td><td>DISC CONTROL DATA ZONE</td></tr>
<tr><td>DEFECT MANAGEMENT ZONE</td><td>DEFECT MANAGEMENT ZONE</td></tr>
<tr><td>DATA AREA</td><td></td><td></td><td>DATA AREA</td></tr>
<tr><td rowspan="2">LEAD-OUT</td><td>DEFECT MANAGEMENT ZONE</td><td>DEFECT MANAGEMENT ZONE</td><td rowspan="2">LEAD-IN</td></tr>
<tr><td>BUFFER ZONE</td><td>BUFFER ZONE</td></tr>
</table>

FIG. 10

| SPECIFICATION | | $\ell_0$ | $\ell_1$ |
|---|---|---|---|
| DEDICATED REPRODUCING AREA | LEAD-IN | DISC-RELATED INFORMATION ZONE | DISC-RELATED INFORMATION ZONE |
| – | | CONNECTION ZONE | CONNECTION ZONE |
| REWRITABLE AREA | | TEST ZONE | TEST ZONE |
| | | DISC CONTROL DATA ZONE | DISC CONTROL DATA ZONE |
| | | DEFECT MANAGEMENT ZONE | DEFECT MANAGEMENT ZONE |
| | DATA AREA | | |
| | LEAD-OUT | DEFECT MANAGEMENT ZONE | DEFECT MANAGEMENT ZONE |
| | | BUFFER ZONE | BUFFER ZONE |

FIG. 11

| SPECIFICATION | | $\ell_0$ | $\ell_1$ |
|---|---|---|---|
| DEDICATED REPRODUCING AREA | LEAD-IN | DISC-RELATED INFORMATION ZONE | – |
| – | | CONNECTION ZONE | CONNECTION ZONE |
| REWRITABLE AREA | | TEST ZONE | TEST ZONE |
| | | DISC CONTROL DATA ZONE | DISC CONTROL DATA ZONE |
| | | DEFECT MANAGEMENT ZONE | DEFECT MANAGEMENT ZONE |
| | DATA AREA | | |
| | LEAD-OUT | DEFECT MANAGEMENT ZONE | DEFECT MANAGEMENT ZONE |
| | | BUFFER ZONE | BUFFER ZONE |

Amended

OPTICAL DISC HAVING A PLURALITY OF RECORDING LAYERS, AND RECORDING METHOD AND REPRODUCING METHOD THEREFOR

Matter enclosed in heavy brackets [ ] appears in the original patent but forms no part of this reissue specification; matter printed in italics indicates the additions made by reissue.

CROSS-REFERENCE TO RELATED APPLICATIONS

This *reissue* application is *for a reissue of U.S. Pat. No. 7,751,300, which issued on Jul. 6, 2010, from application Ser. No. 11/869,827 filed on Oct. 10, 2007, which is* a continuation [application] of *application* Ser. No. 10/447,201 filed *on* May 29, 2003, now U.S. Pat. No. 7,298,689 [and], *which* claims the benefit of Korean Patent Application No. 2002-30301 filed on May 30, 2002, in the Korean Intellectual Property Office, the disclosures of which are incorporated herein by reference.

BACKGROUND OF THE INVENTION

1. Field of the Invention

The present invention relates to optical discs, and more particularly, to an optical disc having at least two recording layers and a recording method and reproducing method thereof.

2. Description of the Related Art

Compact discs (CDs) and digital versatile discs (DVDs) are representative of optical discs, and are used as information storage media. However, as production and distribution of digital contents requiring a relatively large amount of data, for example audio/video (AV) data, rapidly increase, an optical disc having a higher recording capacity is needed to record the digital contents.

To increase the recording capacity of an optical disc, two or more layers to record user data can be formed in the optical disc. However, reliable recording and reproducing operations are difficult where two or more recording layers, as opposed to one recording layer, are present. For example, in order to separately read information recorded on each recording layer, a laser beam has to be controlled more precisely for an optical disc having two or more recording layers. Furthermore, with the multi-layered optical disc, a reading error may occur more frequently due to scratches and/or stains on the disc surface.

SUMMARY OF THE INVENTION

Accordingly, it is an aspect of the present invention to provide an optical disc having a data structure so as to reliably record and/or reproduce data from the optical disc, where the optical disc comprises two or more recording layers, and a recording method and/or reproducing method thereof.

Additional aspects and advantages of the invention will be set forth in part in the description which follows and, in part, will be obvious from the description, or may be learned by practice of the invention.

To achieve the above and/or other aspects of the present invention, there is provided an optical disc comprising recording layers, each of which including a lead-in area, a data area, and a lead-out area, wherein at least one of the lead-in area and lead-out area of one of the recording layers includes a dedicated-reproducing area having a disc-related information zone, and a rewritable area to reproduce user data recorded in the data area.

The optical disc may further comprise a connection zone which is formed between the dedicated-reproducing area and the rewritable area.

The rewritable area may include a test zone, a disc control data zone, and a defect management zone.

The data areas of the recording layers may include tracks that have an identical winding direction.

The data area of each recording layer may include a spiral track which has a winding direction opposite to that of a previous recording layer.

To achieve the above and/or other aspects of the present invention, there is provided another optical disc comprising a first recording layer which includes a first lead-in area, a first data area, and a first lead-out area, and a second recording layer which includes a second lead-in area, a second data area, and a second lead-out area are formed, wherein at least one of the first lead-in area and the second lead-in area includes a dedicated-reproducing area having a disc-related information zone in which disc-related information is recorded, and a rewritable area to reproduce user data recorded in the first or second data area corresponding to the one of the first and second lead-in areas.

The disc-related information may comprise information for both the first recording layer and the second recording layer.

The disc-related information recorded in the first lead-in area may be for the first recording layer, and the disc-related information recorded in the second lead-in area may be for the second recording layer.

To achieve the above and/or other aspects of the present invention, there is provided a method of recording user data on and/or reproducing the user data from an optical disc having recording layers, the method comprising reading disc-related information from a disc-related information zone formed on one of an inner circumference and an outer circumference of a first recording layer of the recording layers of the disc, in response to the disc-related information not being correctly read, reading the disc-related information from a disc-related information zone formed on one of an inner circumference and an outer circumference of a second recording layer of the recording layers, and recording the user data on and/or reproducing the user data from the optical disc based on the read disc-related information.

BRIEF DESCRIPTION OF THE DRAWINGS

These and/or other aspects and advantages of the present invention will become apparent and more readily appreciated from the following description of the embodiments, taken in conjunction with the accompanying drawings of which:

FIG. 4 shows a first embodiment of the data structure recorded on the optical disc of FIG. 1;

FIG. 5 shows a second embodiment of the data structure recorded on the optical disc of FIG. 1;

FIG. 10 shows a first embodiment of the data structure recorded on the optical disc of FIG. 8;

FIG. 11 shows a second embodiment of the data structure recorded on the optical disc of FIG. 8;

DETAILED DESCRIPTION OF THE PREFERRED EMBODIMENTS

Figure 1:
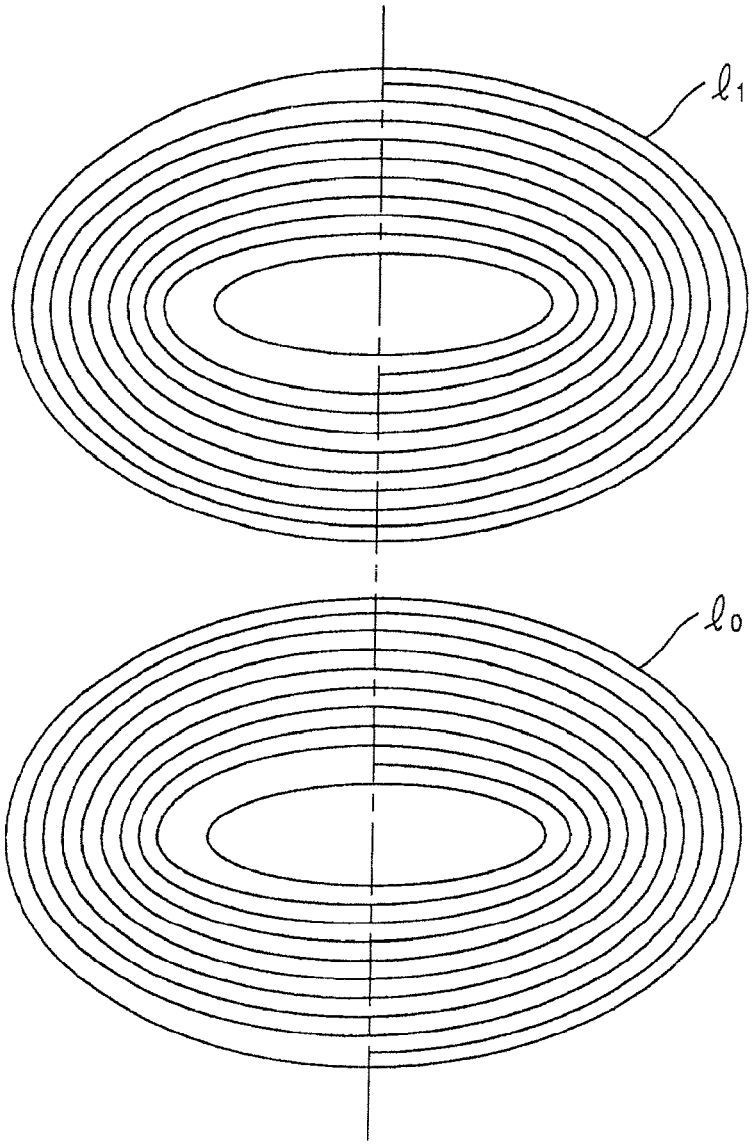
FIG. 1 is a schematic diagram of an optical disc according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 1 shows an optical disc according to an embodiment of the present invention. The optical disc includes a first recording layer l0 and a second recording layer l1. On the first recording layer l0 and the second recording layer l1, respective spiral tracks having opposite directions are formed.

Figure 2:
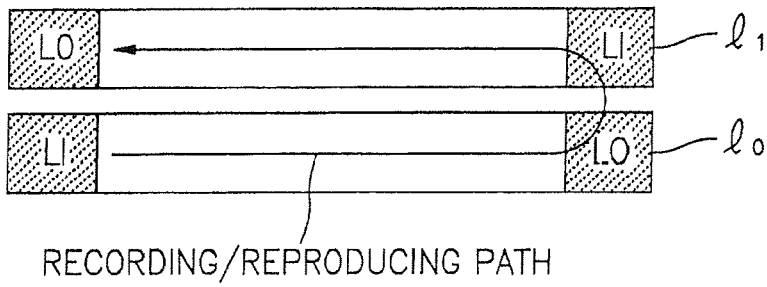
FIG. 2 is a reference diagram illustrating a recording/reproducing direction of the optical disc of FIG. 1.

FIG. 2 shows a recording/reproducing direction of the optical disc of FIG. 1. Referring to FIG. 2, each of the first recording layer l0 and the second recording layer l1 includes a lead-in area LI, a data area, and a lead-out area LO. Shaded areas are lead-in areas LI and lead-out areas LO, and the remaining areas are data areas on which user data may be recorded. Data recorded in the lead-in areas and lead-out areas will be explained later in detail.

Data recording and/or reproducing operation is performed from an inner circumference to an outer circumference of the optical disc by rotating the optical disc counterclockwise where the optical disc is seen from the source of a laser beam. Accordingly, a recording/reproducing path of the optical disc of FIG. 1 follows an opposite track path (OTP) method in which the path begins in the lead-in area of the first recording layer l0, extends through the lead-out area of the first recording layer l0, and the lead-in area of the second recording layer l1, and ends in the lead-out area of the second recording layer 1.

In the present invention, the lead-in area refers to an area of a recording layer where a recording/reproducing in that recording layer begins, and the lead-out area refers to an area of a recording layer where the recording/reproducing in that recording layer ends. Accordingly, the lead-in area and lead-out area are formed at the outer or inner circumference of the optical disc. In the embodiment of FIG. 1, the lead-in area of the first recording layer l0 is formed at the inner circumference of the optical disc, and the lead-out area is formed at the outer circumference of the optical disc, while the lead-in area of the second recording layer l1 is formed at the outer circumference of the optical disc, and the lead-out area is formed at the inner circumference of the optical disc.

Figure 3:
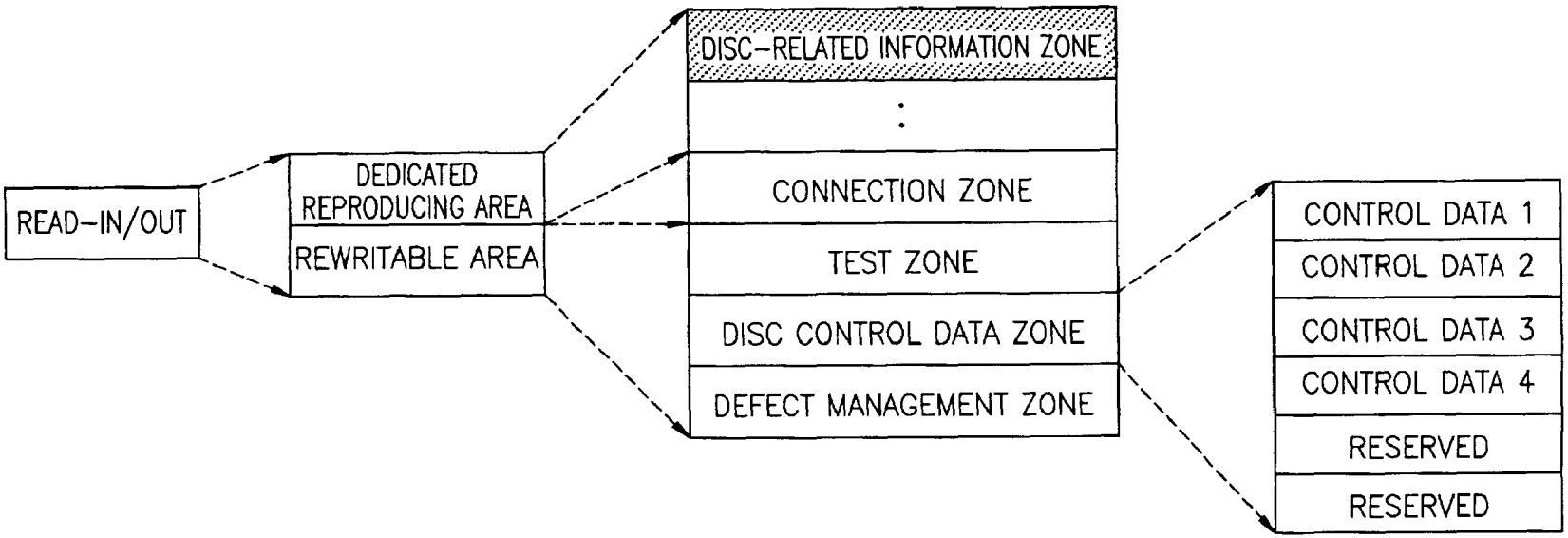
FIG. 3 is a diagram of a structure of data in a lead-in/out area of FIG. 2.

FIG. 3 shows a structure of data in a lead-in/out area of FIG. 2. Referring to FIG. 3, the lead-in/out area comprises a dedicated-reproducing area and a rewritable area. A connection zone is formed between the dedicated-reproducing area and the rewritable area. The dedicated-reproducing area is an area on which dedicated-reproducing data, which once recorded may not deleted, are recorded in advance. The rewritable area is an area on which rewritable user data are recorded.

The dedicated-reproducing area includes a disc-related information zone. In the disc-related information zone, basic information on the optical disc is recorded. For example, in the disc-related information zone, a reference code for an easier adjustment of an optical pickup, such as the location of a focus, and control data, such as the type of the disc, the size of the disc, the version number, the recording density, the number of recording layers, and sector numbers indicating data areas, may be recorded. The disc-related information may be recorded in only one of the first recording layer l0 and the second recording layer l1.

The connection zone plays the role of a transition area located between the dedicated-reproducing area and the rewritable area.

The rewritable area includes a test zone, a disc control data zone, and a defect management zone. The test zone includes a disc test zone and/or a drive test zone. The disc test zone and the drive test zone are, for example, utilized to test a recording pulse. The disc control data zone includes control data for user data that are newly recorded in a data area. The defect management zone includes information to process or manage defects in the optical disc.

In the disc control data zone, a variety of control data may be recorded. In the present embodiment, the disc control data zone comprises a plurality of areas in which predetermined control data are recorded, and reserved areas for future use. An example of control data is drive information. Drive information is information on a drive which was used in recording of data, and includes manufacturer information and an identifier.

Where the lead-in/out area of a predetermined recording layer has the above-described structure, the lead-out/in area of the same recording layer has only a defect management zone and a buffer zone. The purpose of the defect management zone is the same as described above, and the buffer zone indicates a kind of a transition area, that is, a predetermined area or a boundary between areas.

FIG. 4 shows a first embodiment of the structure of data recorded on the optical disc of FIG. 1. Referring to FIG. 4, both the first recording layer l0 and the second recording layer l1 have respective disc-related information zones. That is, a disc-related information zone is in each of the lead-in area of the first recording layer l0 and the lead-out area of the second recording layer l1. In the disc-related information zones, information on respective recording layers may be recorded separately, or together.

The remaining areas, that is, the connection zones, the test zones, the disc control data zones, and defect management zones, of the two layers are arranged in an identical order in a radial direction of the optical disc. In addition, there is a buffer zone in each of the lead-out area of the first recording layer l0 and the lead-in area of the second recording layer l1, so as to have the buffer zones meet the first recording layer l0 on a recording/reproducing path.

FIG. 5 shows a second embodiment of the structure of data recorded on the optical disc of FIG. 1. Referring to FIG. 5, a disc-related information zone is provided only on the first recording layer l0. In the disc-related information zone, information on both the first recording layer l0 and the second recording layer l1 is recorded.

The remaining areas, that is, the connection zones, the test zones, the disc control data zones, and the defect management zones, of the two layers are arranged in an identical order in a radial direction of the optical disc. Also, as in FIG. 4, there is a buffer zone in each of the lead-out area of the first recording layer l0 and the lead-in area of the second recording layer l1, so as to have the buffer zones meet each other on a recording/reproducing path.

Figure 6A:
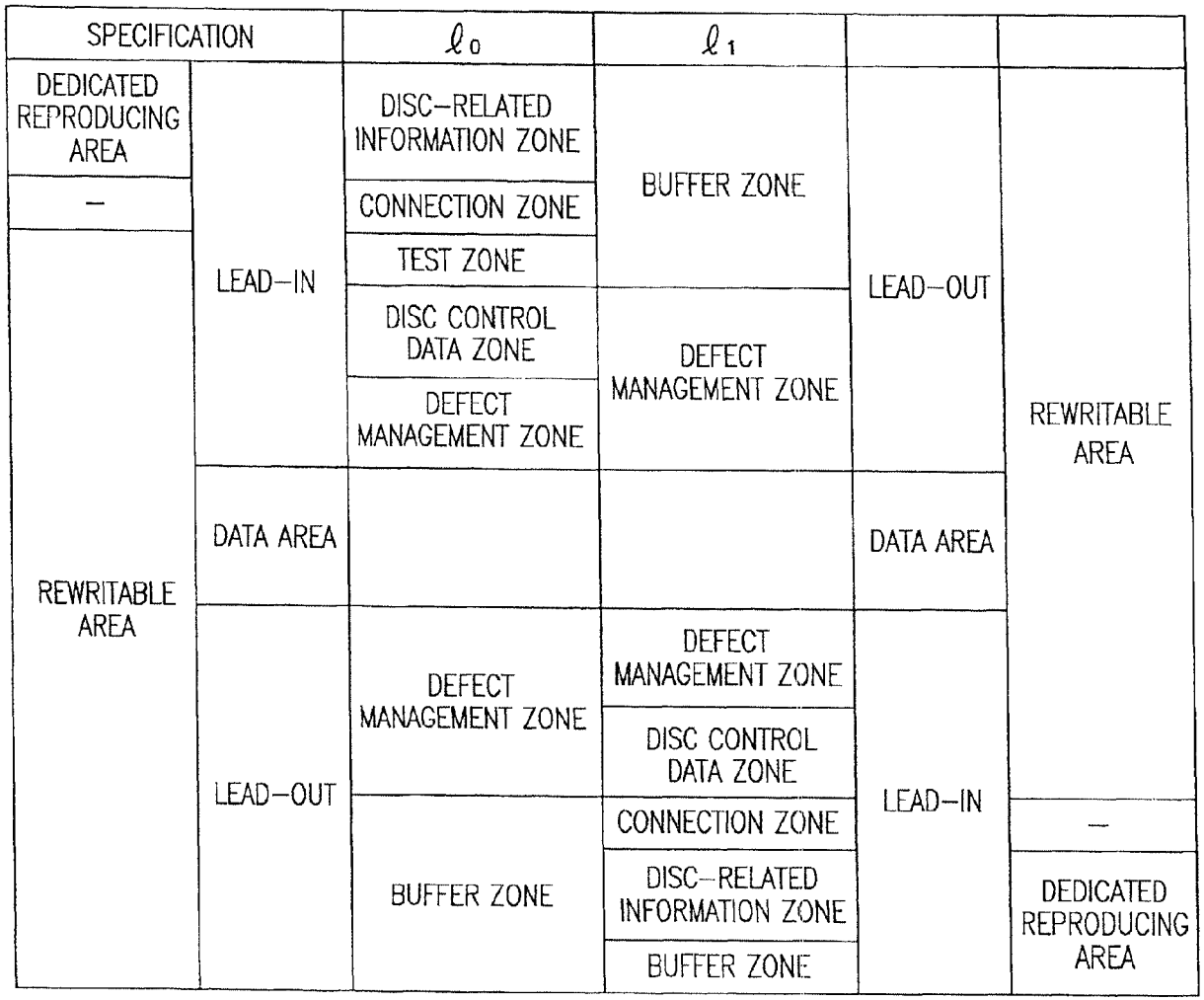
FIGS. 6A and 6B show third and fourth embodiments of the data structure recorded on the optical disc of FIG. 1.
Figure 6B:
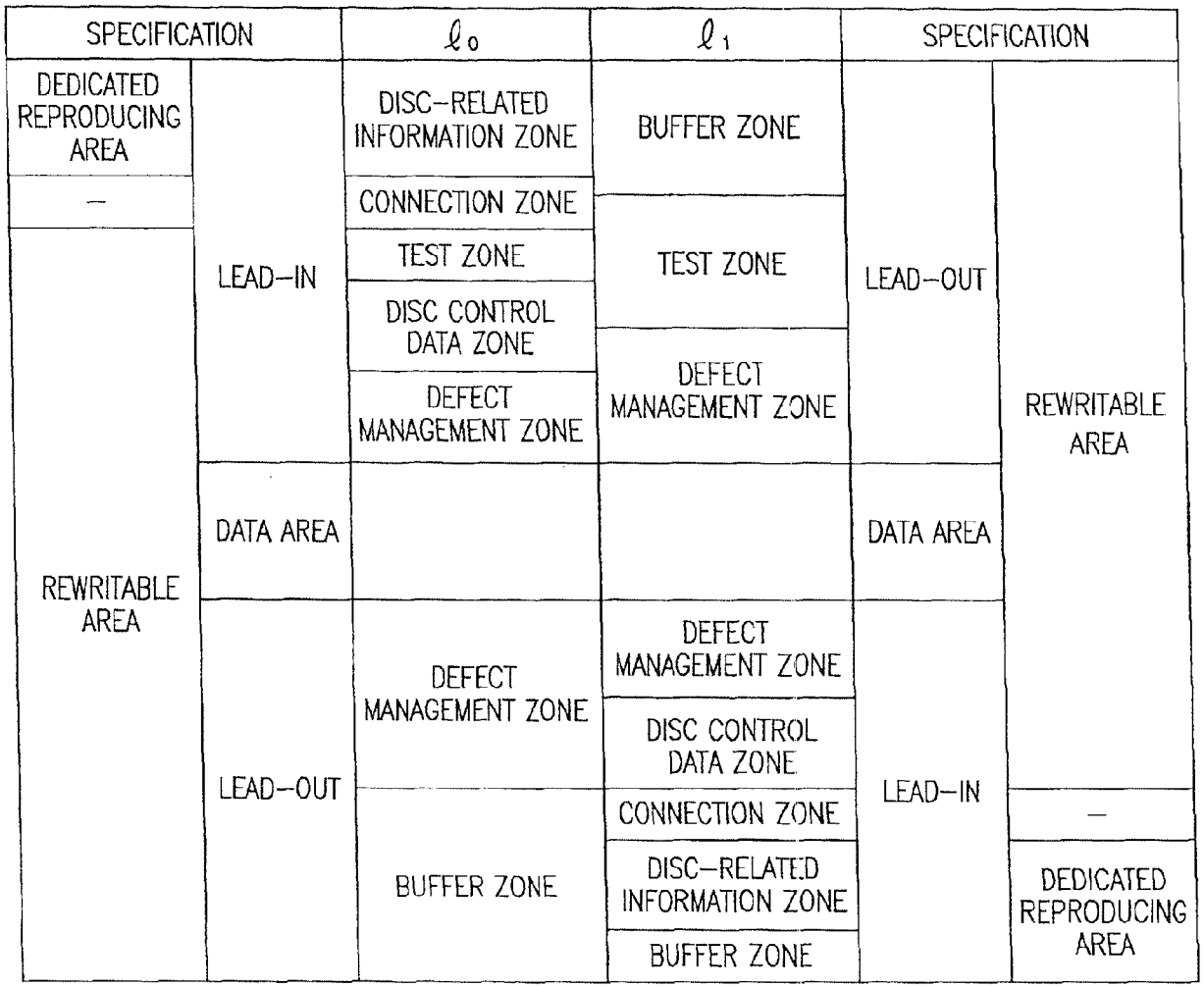

FIGS. 6A and 6B show third and fourth embodiments of the structure of data recorded on the optical disc of FIG. 1. Referring to FIGS. 6A and 6B, both the first recording layer l0 and the second recording layer l1 have respective disc-related information zones. That is, a disc-related information zone is in each of the lead-in area of the first recording layer l0 and the lead-out area of the second recording layer l1. However, the disc-related information zones, the connection zones, the disc control data zones, and the defect management zones of the two recording layers are arranged in the opposite order in a radial direction of the optical disc. As an exception, a test zone may be located only on the first recording layer l0, as shown in FIG. 6A, or may be located on each of the two layers at a physically identical location (inner circumference or outer circumference), as shown in FIG. 6B. A buffer zone is provided in each of the lead-out area of the first recording layer l0 and the lead-in area of the second recording layer l1, so as to have the buffer zones meet each other on a recording/reproducing path.

The disc-related information zone of the first recording layer l0 and the disc-related information zone of the second recording layer l1 are recorded on the inner circumference and the outer circumference, respectively, of the optical disc. Accordingly, even where information cannot be correctly read from the inner/outer circumference of the disc because of, for example, dust or fingerprints on a disc surface, that information can be read from the disc-relation information zone on the outer/inner circumference. This structure improves the reliability of recording/reproducing. Moreover, where information on both recording layers is recorded in the disc-related information zone, the reliability of recording/reproducing is further improved.

Figure 7A:
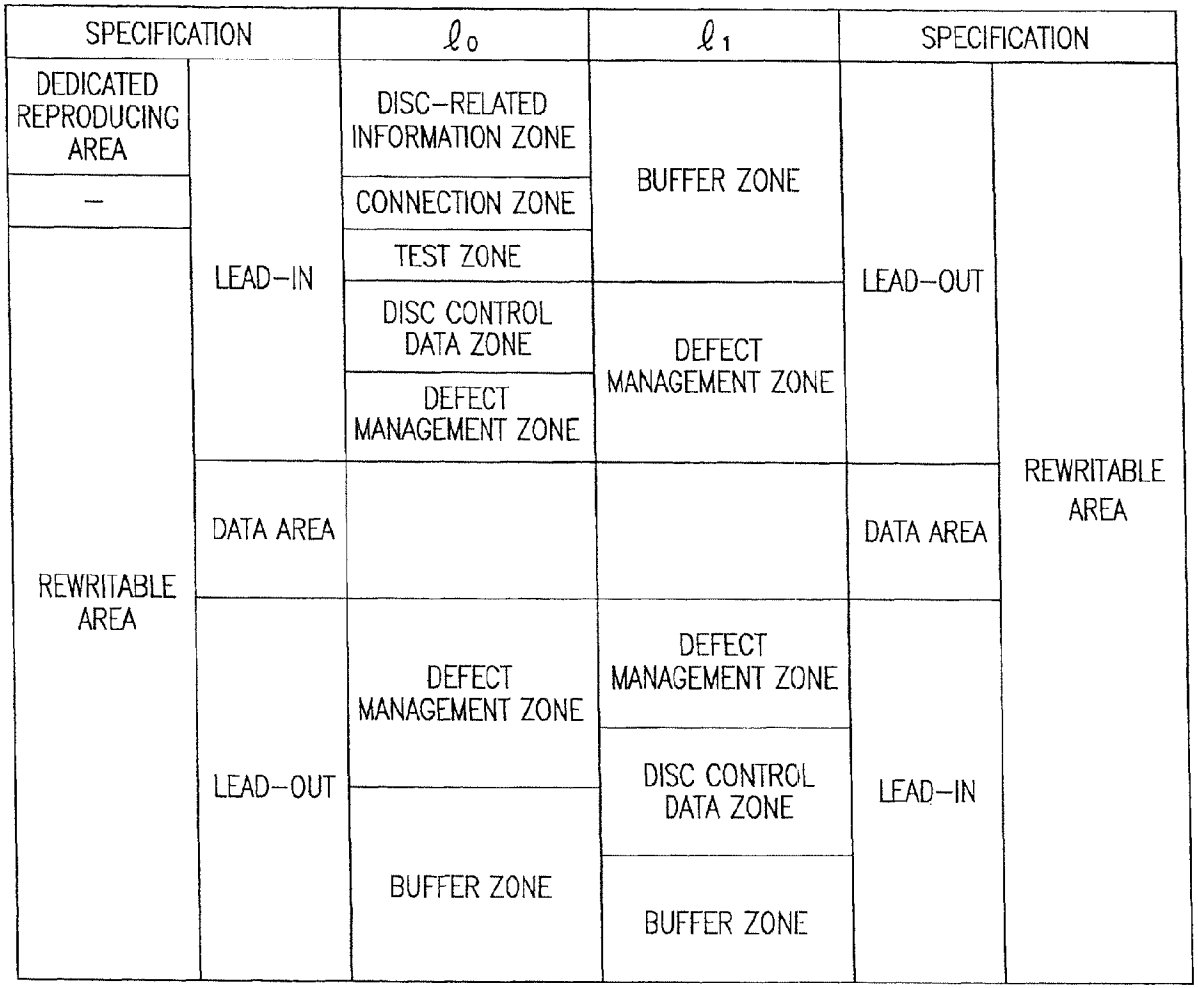
FIGS. 7A and 7B show fifth and sixth embodiments of the data structure recorded on the optical disc of FIG. 1.
Figure 7B:
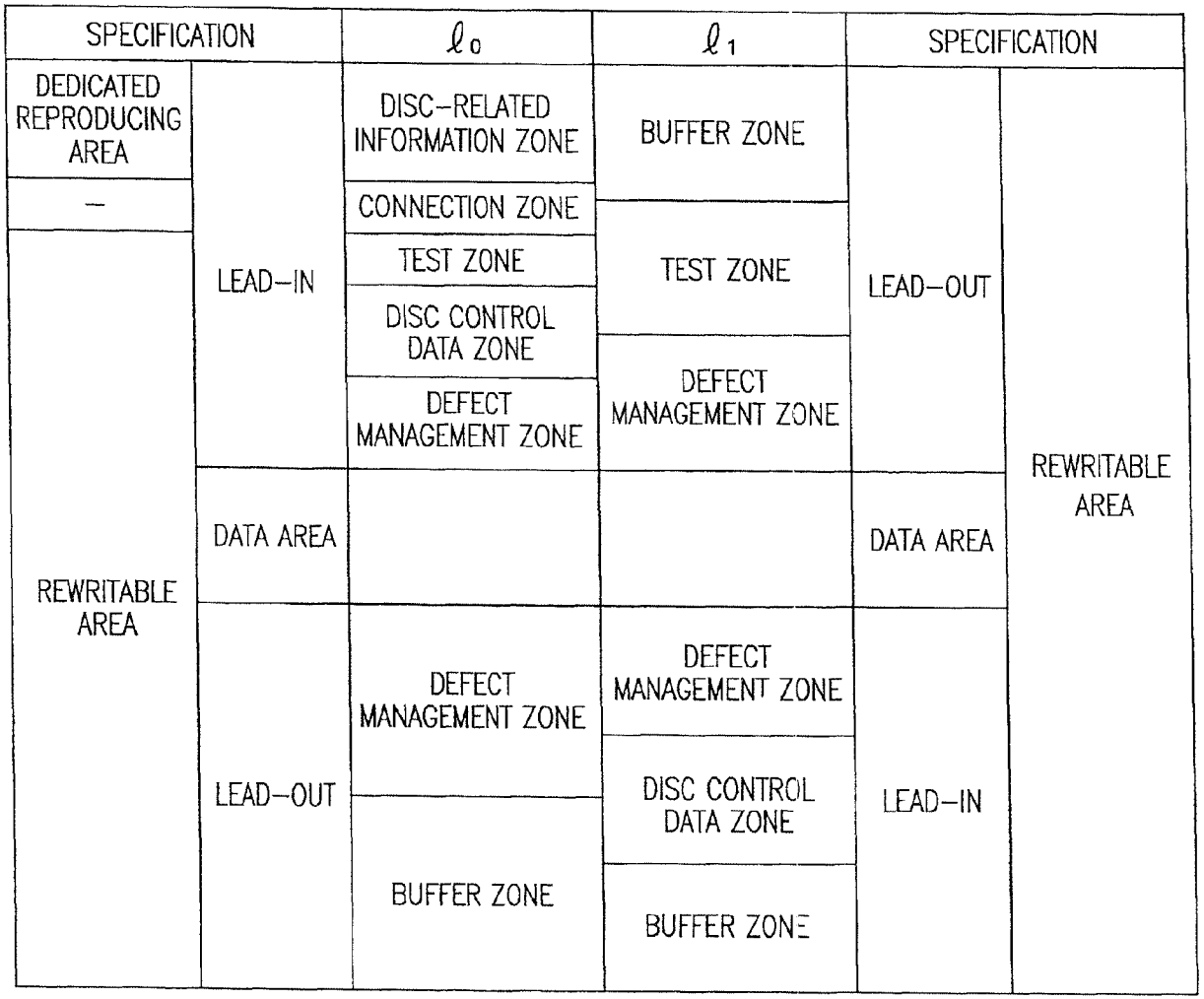

FIGS. 7A and 7B show fifth and sixth embodiments of the structure of data recorded on the optical disc of FIG. 1.

Referring to FIGS. 7A and 7B, the first recording layer l0 has both a dedicated-reproducing area and a rewritable area. In the disc-related information zone of the dedicated-reproducing area, information on both the first recording layer l0 and the second recording layer l1 is recorded. The first recording layer l0 has the same data structure as explained referring to FIG. 3, while the second recording layer l1 has a different data structure. That is, both the lead-in area and lead-out area of the second recording layer l1 are formed as rewritable areas. More specifically, the lead-in area of the second recording layer l1 comprises a defect management zone, a disc control data zone, and a buffer zone, and the lead-out area of the second recording layer l1 comprises a defect management zone, and a buffer zone. A test zone may be located only on the first recording layer l0, as shown in FIG. 7A, or at a physically identical location (inner circumference or outer circumference) on each of the two layers, as shown in FIG. 7B. A buffer zone of the lead-out area of the first recording layer l0 and a buffer zone of the lead-in area of the second recording layer l1 are arranged in identical locations in a radial direction of the disc.

Figure 8:
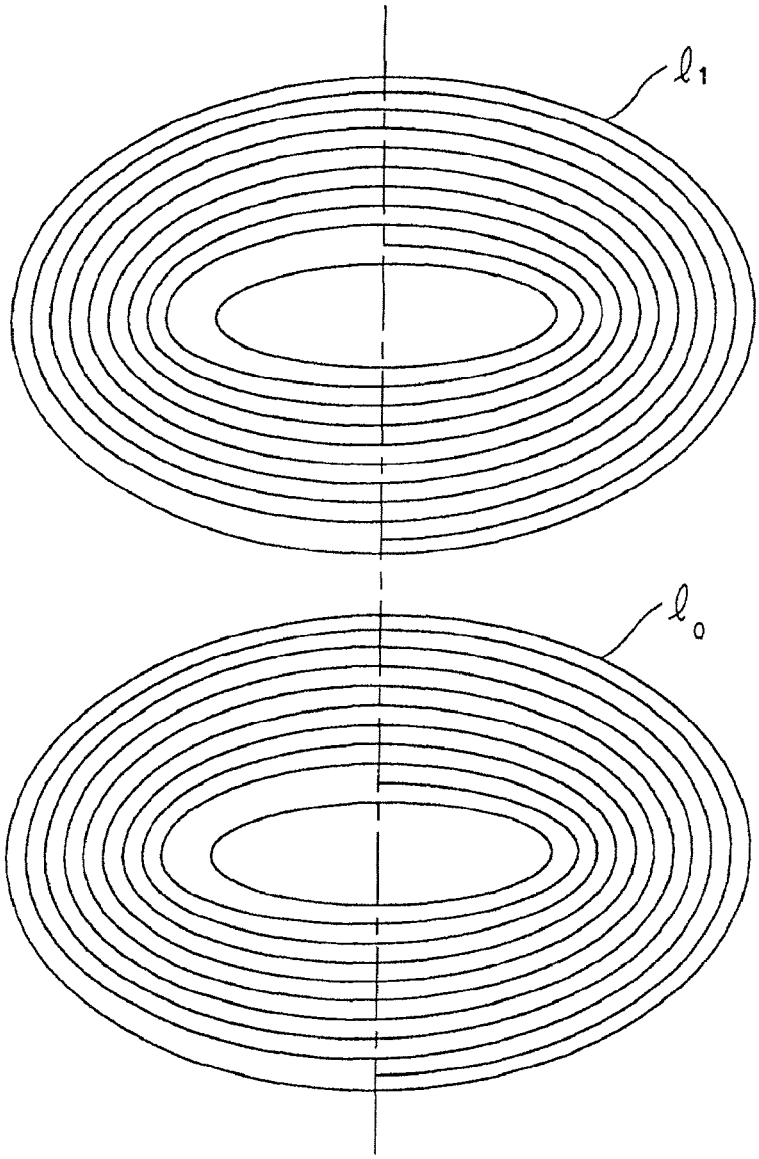
FIG. 8 is a schematic diagram of an optical disc according to another embodiment of the present invention.

FIG. 8 shows an optical disc according to another embodiment of the present invention. Referring to FIG. 8, the optical disc includes a first recording layer l0 and a second recording layer l1. On the first recording layer l0 and the second recording layer l1, respective spiral tracks having an identical winding direction are formed.

Figure 9:
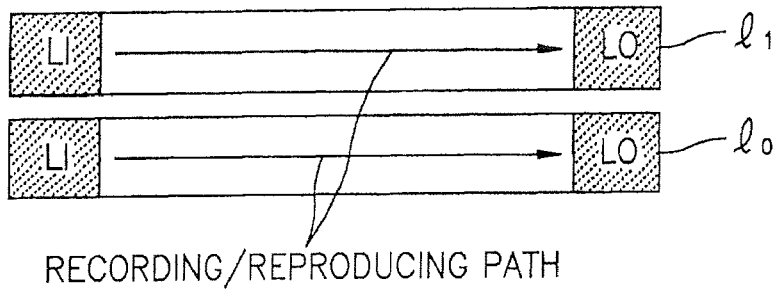
FIG. 9 is a reference diagram illustrating a recording/reproducing direction of the optical disc of FIG. 8.

FIG. 9 shows a recording/reproducing direction of the optical disc of FIG. 8. Referring to FIG. 9, each of the first recording layer l0 and the second recording layer l1 includes a lead-in area LI, a data area, and a lead-out area LO. Shaded areas are lead-in areas LI and lead-out areas LO, and the remaining areas are data areas on which user data may be recorded. Data recorded in the lead-in areas and lead-out areas will be explained later in detail.

Data recording and/or reproducing operation is performed from an inner circumference to an outer circumference of the optical disc by rotating the optical disc counterclockwise where the optical disc is seen from the source of a laser beam. The recording/reproducing path of the optical disc of FIG. 9 follows a parallel track path (PTP) method in which the path begins in the lead-in area of the first recording layer l0 and ends in the lead-out area of the first recording layer l0, and begins again in the lead-in area of the second recording layer l1, and ends in the lead-out area of the second recording layer l1. As described above referring to FIG. 2, the lead-in area refers to an area of a recording layer where a recording/reproducing in that recording layer begins, and the lead-out area refers to an area of a recording layer where the recording/reproducing in that recording layer ends. Accordingly, in the present embodiment, the lead-in areas of the first recording layer l0 and the second recording layer l1 are formed at the inner circumferences of the optical disc, and the lead-out areas of the first recording layer l0 and the second recording layer l1 are formed at the outer circumferences of the optical disc.

FIG. 10 shows a first embodiment of the structure of data recorded on the optical disc of FIG. 8. A disc-related information zone, a connection zone, a disc control data zone, and a defect management zone have the similar structures and/or configurations as explained above with reference to FIG. 3.

Referring to FIG. 10, both the first recording layer l0 and the second recording layer l1 have respective disc-related information zones. That is, a disc-related information zone is in each of the lead-in areas of the first recording layer l0 and the second recording layer l1. In the disc-related information zones, information on respective recording layers may be recorded separately, or together. The remaining areas, that is, the connection zones, the test zones, the disc control data zones, and defect management zones, of the two layers are arranged in an identical order in a radial direction of the disc. In addition, in each of the lead-out area of the first recording layer l0 and the lead-in area of the second recording layer l1, there is a buffer zone.

While the test zones are formed on both of the recording layers l0 and l1, as shown in FIG. 10, a test zone may be formed on only one of the first recording layer l0 and the second recording layer l1.

FIG. 11 shows a second embodiment of the structure of data recorded on the optical disc of FIG. 8. Referring to FIG. 11, a disc-related information zone is provided only on the first recording layer l0. In this case, information on both the first recording layer l0 and the second recording layer l1 is recorded in the disc-related information zone.

The remaining areas, that is, the connection zones, the test zones, the disc control data zones, and the defect management zones, of the two layers are arranged in an identical order in a radial direction of the optical disc. Also, as in FIG. 10, there is a buffer zone in each of the lead-out area of the first recording layer l0 and the lead-in area of the second recording layer l1, so as to have the buffer zones meet each other on a recording/reproducing path.

Examples of a dedicated-reproducing area and a rewritable area formed in the lead-in/out area having the data structure described above will now be explained. A connection zone and a buffer zone are formed such that the zones have physical characteristics that can be distinguished from neighboring zones. For example, a connection zone and a buffer zone may be formed as mirror areas. Where a neighboring zone is formed as a wobble track, the connection zone and buffer zone may be formed as wobble tracks with wobble signals different from the wobble signal recorded in the neighboring zone.

While the test zones are formed on both recording layers l0 and l1, a test zone may be formed on only one of the first recording layer l0 and the second recording layer l1.

Figure 12:
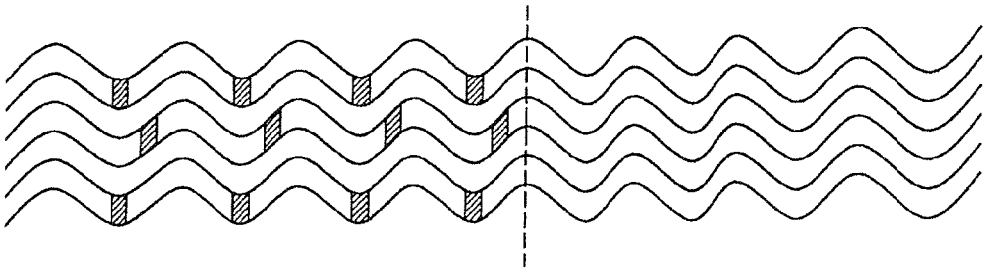
FIG. 12 shows a first embodiment of a dedicated-reproducing area and rewritable area.

FIG. 12 shows a first embodiment of a dedicated-reproducing area and a rewritable area of an optical disc according to the present invention. As shown in FIG. 12, the dedicated-reproducing area and the rewritable area are formed as wobble tracks. Here, data on the dedicated-reproducing area are recorded as land pre-pits, and data on the rewritable area are loaded on a wobble signal and then recorded.

Figure 13:
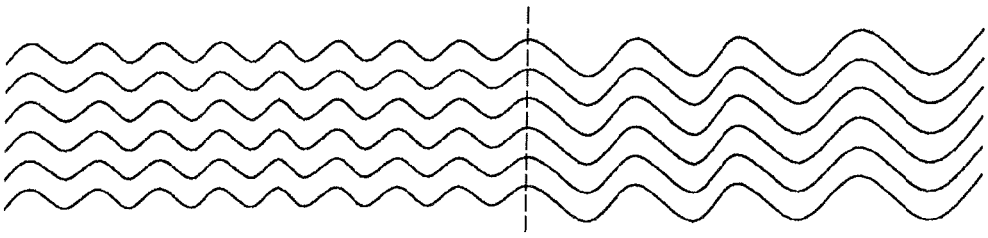
FIG. 13 shows a second embodiment of a dedicated-reproducing area and rewritable area.

FIG. 13 shows a second embodiment of a dedicated-reproducing area and a rewritable area of an optical disc according to the present invention. As shown in FIG. 13, the dedicated-reproducing area is formed as a high-frequency wobble track on which a high-frequency wobble signal is recorded, and the rewritable area is formed as a low-frequency wobble track on which a low-frequency wobble signal is recorded.

In FIGS. 12 and 13, since both the dedicated-reproducing area and the rewritable area are formed as wobble tracks, the physical shapes are uniform on the entire disc. Accordingly, even where the disc has two or more recording layers, the disc has good reproduction characteristics.

Figure 14:
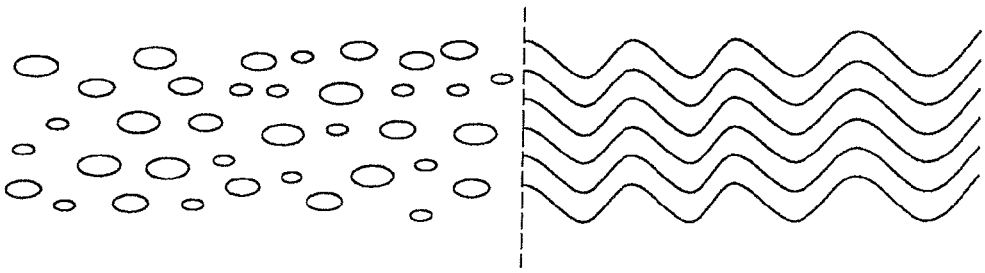
FIG. 14 shows a third embodiment of a dedicated-reproducing area and rewritable area.

FIG. 14 shows a third embodiment of a dedicated-reproducing area and a rewritable area of an optical disc according to the present invention. As shown in FIG. 14, the dedicated-reproducing area is formed as a pre-pit area on which data are recorded as pre-pits, and the rewritable area is formed as a wobble track on which a wobble signal containing corresponding data is recorded. Since the rewritable area is also formed as a wobble track like a data area, the areas have a more uniform physical shape. Accordingly, even where the disc has two or more recording layers, the disc has good reproduction characteristics.

Figure 15:
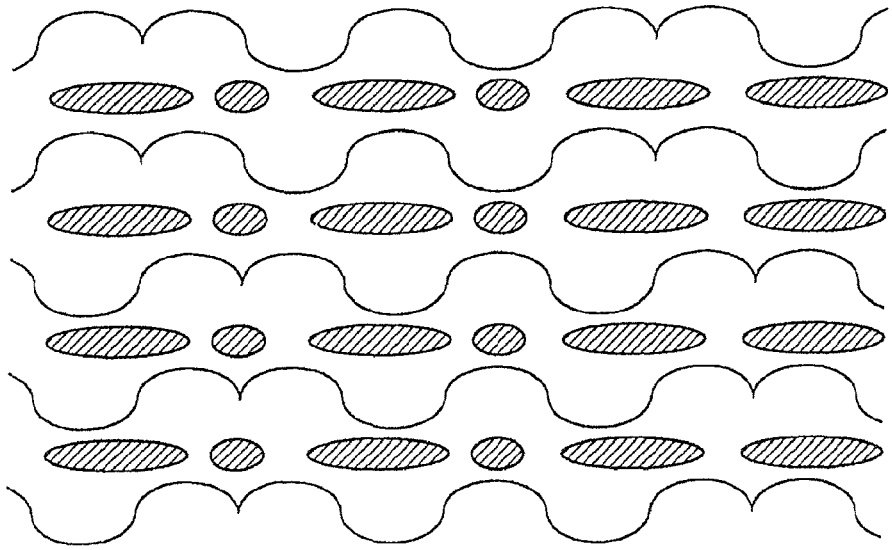
FIG. 15 shows a fourth embodiment of a dedicated-reproducing area and rewritable area.

FIG. 15 shows a fourth embodiment of a dedicated-reproducing area and a rewritable area of an optical disc according to the present invention. As shown in FIG. 15, the dedicated-reproducing area is formed as a wobble track on which a wobble signal containing corresponding data is recorded, and the data corresponding to the rewritable area is recorded as recording marks in the wobble track of the dedicated-reproducing area. Since in one area, the data of the dedicated-reproducing area is recorded as a wobble signal, and the data of the rewritable area is recorded as recording marks, the data area in which user data are recorded becomes relatively wider. Accordingly, this embodiment results in a structure which increases the recording capacity of the optical disc.

Figure 16A:
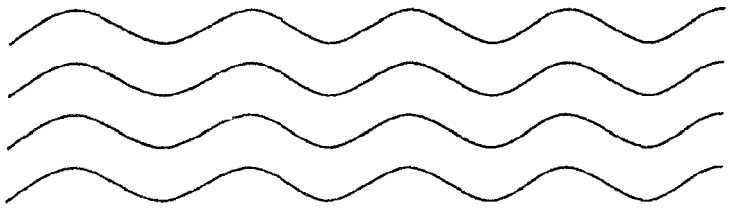
FIGS. 16A through 20 are reference diagrams illustrating a wobble signal modulation methods.
Figure 16B:
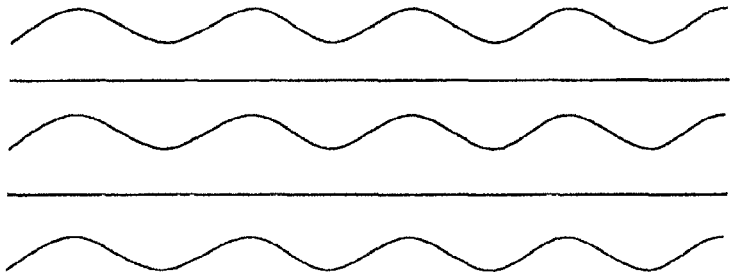

The wobble track described above may have wobbles formed on both side walls of a groove and a land, as shown in FIG. 16A, or may have wobbles formed on only one side wall of a land or a groove, as shown in FIG. 16B.

Figure 17A:
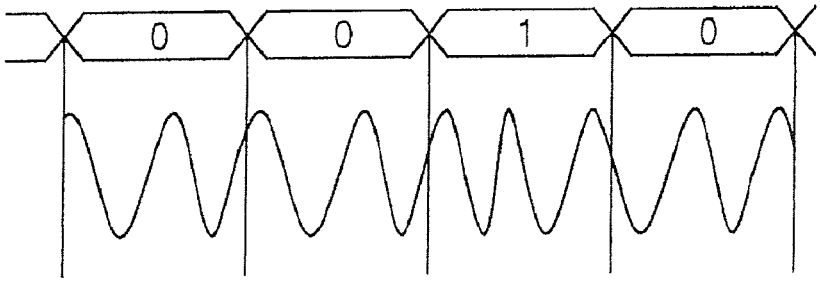
Figure 17B:
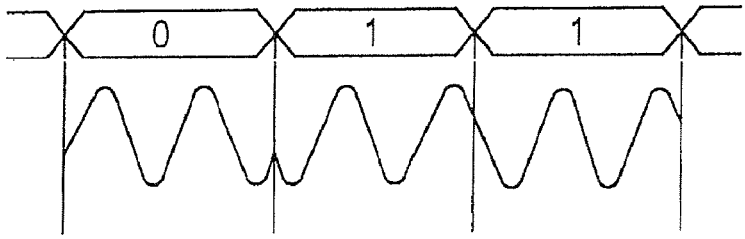
Figure 17C:
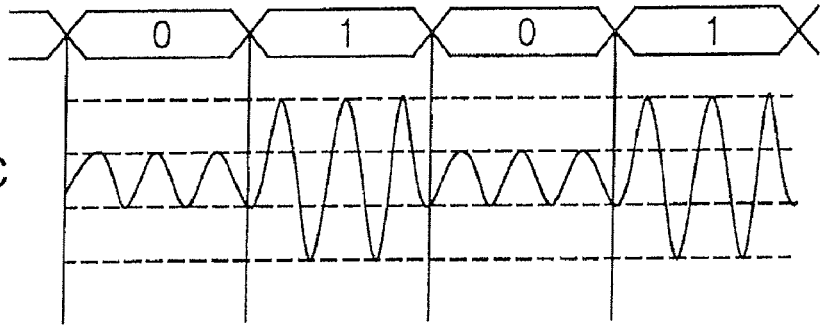
Figure 18:
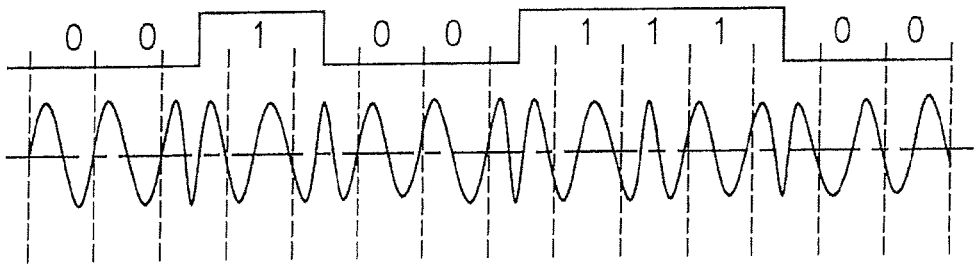
Figure 19:
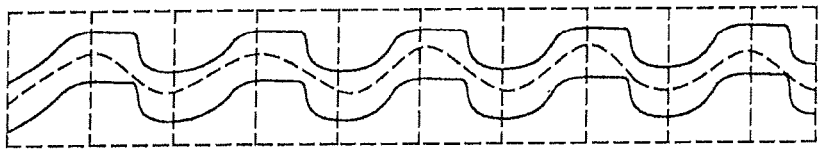
Figure 20:
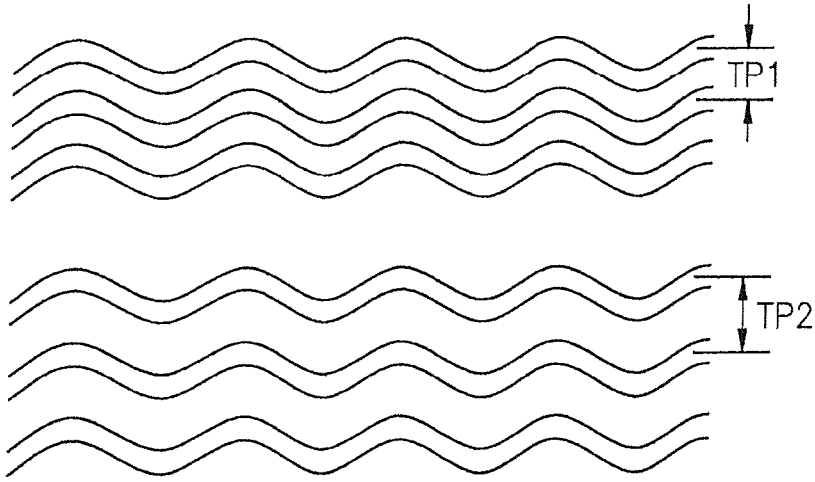

In addition, in a wobble signal read from a wobble track, data is loaded by being modulated by any of the following methods. FIG. 17A shows a frequency modulation method in which the frequency of a wobble signal is modulated between two different values to represent data bits having a logic value "0" and data bits having a logic value "1". FIG. 17B shows a phase modulation method in which the phase of a wobble signal is modulated by a reversal to represent data bits having a logic value "0" and data bits having a logic value "1". FIG. 17C shows an amplitude modulation method in which the amplitude of a wobble signal is modulated between two different values to represent data bits having a logic value "0" and data bits having a logic value "1". FIG. 18 shows a minimum shift keying (MSK) method in which only the frequency of a partial interval of a continuous wobble signal changes. FIG. 19 shows a saw tooth wobble (STW) method in which a wobble signal having a saw tooth shape is recorded. In the saw tooth wobble signal, a logic value is determined as "0" or "1" according to the direction of the slope of the saw tooth. In addition, as shown in FIG. 20, by forming different track pitches (TP1, TP2) of wobble tracks on which a wobble signal is recorded, crosstalk between the tracks can be reduced.

Based on the structure described above, a recording/reproducing method according to the present invention will now be explained.

Figure 21:
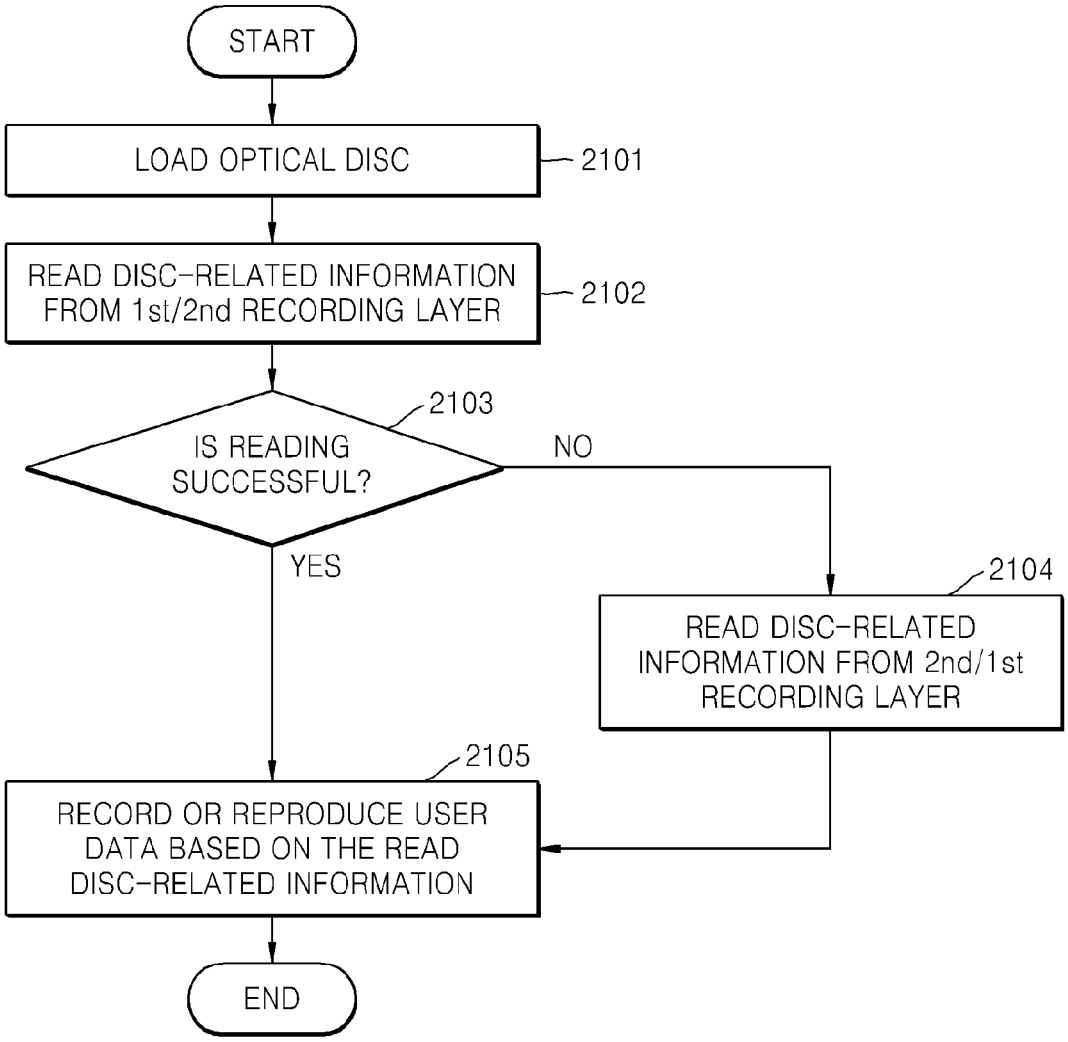
FIG. 21 is a flowchart illustrating a recording/reproducing method according to an embodiment of the present invention.

FIG. 21 shows a flowchart illustrating a recording/reproducing method according to the present invention. Referring to FIG. 21, in operation 2101, an optical disc is loaded into a recording/reproducing apparatus. In operation 2102, an optical pickup of the recording/reproducing apparatus reads disc-related information from a disc-related information zone located on one of the first recording layer l0 and the second recording layer l1. In operation 2103, it is determined whether or not the disc-related information is read successfully. Where the reading was unsuccessful, the optical pickup of the recording/reproducing apparatus reads disc-related information from a disc-related information zone in the other layer of the first recording layer l0 and the second recording layer l1, in operation 2104. In operation 2105, based on the disc-relation information, the recording/reproducing apparatus records user data in a data area or reproduces the user data recorded from the data area. Where the disc-related information is read successfully without error in the operation 2103, based on the information, the user data is recorded on or reproduced from the optical disc, in operation 2105.

In an optical disc having three or more recording layers, in which information on all recording layers is recorded in each of disc-related information zones formed at different locations on respective recording layers, where reading information from a disc-related information zone of one recording layer fails, the information can be read from disc-related information zones of other recording layers, thereby improving the reliability of recording/reproducing.

As described above, according to the present invention, even in an optical disc having two or more recording layers, data can be reliably recorded and reproduced.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A reproducing apparatus[,] comprising:

a reading unit to read data from an optical disc comprising a first recording layer and a second recording layer*, the data comprising disc-related information for both the first recording layer and the second recording layer, and*

*data for reproducing user data recorded in one or both of the first recording layer and the second recording layer*; and a controller to control the reading unit to read the disc-related information *for both the first recording layer and the second recording layer* and the data for reproducing the user data *recorded in one or both of the first recording layer and the second recording layer*;

wherein a [lead in] *lead-in* area included in the first recording layer [includes] *comprises* a dedicated-reproducing area in which *the* disc-related information for both the first *recording layer* and the second recording [layers] *layer* is recorded, a [rewritable] *recordable* area in which *the* data for reproducing *the* user data recorded in *one or both of* the first *recording layer* and the second recording [layers] *layer* is recorded, and a connection zone [which is formed] between the dedicated-reproducing area and the [rewritable] *recordable* area[,]*;* and

[wherein] a frequency of a wobble signal [formed] *recorded* in the dedicated-reproducing area is higher than a frequency of a wobble signal [formed] *recorded* in the [rewritable] *recordable* area.

2. The reproducing apparatus of claim 1, wherein the [rewritable] *recordable* area [includes] *comprises* a test zone, a disc control data zone, and a defect management zone.

3. The reproducing apparatus of claim 2, wherein [the] *a* defect management zone is [formed] *provided* in each of a first lead-out-area included in the first recording layer and a second lead-out area included in the second recording layer.

4. The reproducing apparatus of claim 3, wherein the first lead-in area, a first data area, and the first lead-out area[,] included in the first recording layer are arranged in the same order as a second lead-in area, a second data area, and the second lead-out area[,] included in the second recording layer[,] in a radial direction of the optical disc.

5. The reproducing apparatus of claim 3, wherein the first lead-in area, a first data area, and the first lead-out area[,] included in the first recording layer are arranged in the opposite order as the second lead-out area, the second data area, and a second lead-in area[,] included in the second recording layer[,] in a radial direction of the optical disc.

6. The reproducing apparatus of claim 1, wherein [data included in] the wobble signal [are provided after being] *of the dedicated-reproducing area and the wobble signal of the recordable area comprise data* modulated by [at least one of a] frequency modulation, [an] *or* amplitude modulation, [a] *or* phase modulation, [a] *or* minimum shift keying modulation [and a]*, or* saw tooth modulation*, or any combination thereof*.

7. The reproducing apparatus of claim 1, wherein [at least one of] *the wobble signal of* the dedicated-reproducing area [and] *is recorded on wobble tracks having a first track pitch and the wobble signal of* the [rewritable] *recordable* area is [formed as] *recorded on* wobble tracks having *a second track pitch* different *from the first* track [pitches so as] *pitch* to prevent crosstalk between the wobble tracks *of the dedicated-reproducing area and the wobble tracks of the recordable area*.

8. An optical disc comprising a first recording layer and a second recording layer, wherein:

a [lead in] *lead-in* area included in the first recording layer [includes] *comprises* a dedicated-reproducing area in which disc-related information for both the first *recording layer* and the second recording [layers] *layer* is recorded, a [rewritable] *recordable* area in which data for reproducing user data recorded in *one or both of* the first *recording layer* and the second recording [layers] *layer* is recorded, and a connection zone [which is formed] between the [dedicated reproducing] *dedicated-reproducing* area and the [rewritable] *recordable* area; and a frequency of a wobble signal [formed] *recorded* in the dedicated-reproducing area is higher than a frequency of a wobble signal [formed] *recorded* in the [rewritable] *recordable* area.

9. The reproducing apparatus of claim 1, wherein the disc-related information comprises information on [the] *a* size of the optical disc, and information on [the] *a* number of recording layers *in the optical disc*.

10. The optical disc of claim 8, wherein the disc-related information comprises information on [the] *a* size of the optical disc, and information on [the] *a* number of recording layers *in the optical disc*.

* * * * *